United States Patent [19]

Khayrallah

[11] Patent Number: 6,005,899

[45] Date of Patent: Dec. 21, 1999

[54] METHOD FOR EFFICIENTLY COMPUTING SEQUENCE CORRELATIONS

[75] Inventor: Ali S. Khayrallah, Apex, N.C.

[73] Assignee: Ericsson, Inc., Research Triangle Park, N.C.

[21] Appl. No.: 08/939,517

[22] Filed: Sep. 29, 1997

[51] Int. Cl.⁶ .............................. H03D 1/00; G06F 17/15
[52] U.S. Cl. ........................................... 375/343; 708/422
[58] Field of Search ..................................... 375/343, 242; 708/314, 422, 423; 341/97

[56] References Cited

U.S. PATENT DOCUMENTS

| | | | |
|---|---|---|---|
| 5,684,727 | 11/1997 | Campbell et al. | 708/422 |
| 5,872,815 | 2/1999 | Strolle et al. | 375/321 |

FOREIGN PATENT DOCUMENTS

| | | |
|---|---|---|
| WO 96/11445 | 4/1996 | WIPO . |
| WO 97/36395 | 10/1997 | WIPO . |

*Primary Examiner*—Chi H. Pham
*Assistant Examiner*—Khai Tran
*Attorney, Agent, or Firm*—Coats & Bennett, P.L.L.C.

[57] ABSTRACT

An improved method for computing sequence correlations utilizes pre-calculated look-up tables to reduce computational burdens. A sample sequence of symbols, such as a received sequence of symbols, is divided into a series of subblocks. A look-up table of combinational values is built for each subblock wherein the combinational values are arithmetic sums of the symbols in the subblock, either as received or negated. Preferably, the combinational values are computed in Gray code order so as to take advantage of bit-shifting and sign changes to lessen computational burdens. Correlation factors with respect to a known sequence of symbols are then calculated using the combinational values from these pre-calculated tables whenever possible. The correlation factors are then used in a known fashion to reach a correlation result. This method increase correlation computational efficiency in many situations, particularly for joint demodulation, code acquisition, and/or interference cancellation in wireless communications systems.

46 Claims, 1 Drawing Sheet

METHOD FOR EFFICIENTLY COMPUTING SEQUENCE CORRELATIONS

FIELD OF INVENTION

The present invention relates generally to the field of sequence correlation, and, in particular, to a method for computing correlations between a received signal and a known sequence in wireless communications systems.

BACKGROUND OF THE INVENTION

In many communications systems, there is a need to compute correlations between a received signal and a known sequence. This is particularly true for wireless communications systems such as cellular telephone systems.

Correlation, as used herein, is a process by which a sample sequence is compared or matched against a known sequence to determine where, or if, the known sequence is present in the sample sequence. Examples of when correlation is used include synchronization and joint demodulation in many wireless systems such as GSM, D-AMPS, and TETRA, as well as code acquisition in CDMA systems such as IS-95. Proper correlation is very important for proper functioning of these systems.

Typically, the sample sequence is a received signal and the correlation process attempts to either determine the start of a communications frame (synchronization) or separate commingled signals (joint demodulation). The traditional correlation process is computationally intensive; the known sequence is compared against the sample sequence in an increment-by-increment fashion. For each incremental comparison, a correlation factor, or score, is obtained. The highest correlation factor identifies the best fit of the known sequence to the sample sequence, which should correspond to the location in the sample sequence where the known sequence appears.

Consider a simple synchronization example for a communications signal divided into groups known as communications frames. For a receiver to properly interpret a received signal, the receiver must be able to determine where one frame begins and another ends. In order to facilitate this, each frame contains a known synchronization sequence in addition to the communications data. For simplicity, assume that the synchronization (sync) sequence is at the beginning of each frame. At the transmitter, a frame is constructed using a block of data and the known sync sequence $s=(s_0, s_1, \ldots s_{L-1})$ having a length L to identify the boundaries of the frame. The transmitter combines one or more frames and transmits the frames as a communications signal to a receiver. The receiver assembles the received signal into a received sequence $r=(r_0, r_1, \ldots r_{F-1})$. The receiver then determines the boundaries of the frame by correlating the received sequence r with the known sync sequence s. The correlation of the received sequence to the sync sequence involves calculating a series of correlation factors $C_j$, and then selecting the correlation factor having the highest value. The correlation factors are calculated according to the formula $$C_j = \sum_{i=0}^{L-1} s_i r_{j+i}$$

for a range of values, say $0 \leq j < N-1$, where $N=F-L+1$ and F is frame length in number of elements. Note that it is always assumed that $L \leq F$, i. e., the known sync sequence length is no larger than the frame length. In FIG. 1, L is seven, F is fifteen, meaning N is nine. In simple terms, N represents the number of correlation factors that must be computed for each correlation.

The formula above is essentially the mathematical equivalent of laying the known sync sequence over the received signal to determine where the best fit is. When the fit is best, the correlation factor should be the highest, indicating the location of a frame boundary. Once the frame boundary is known, the data content of the frame can be properly interpreted.

Assuming the sync sequence is a bipolar ($\pm 1$) sequence, and the received sequence is comprised of real numbers, then the calculation of each correlation factor $C_j$ requires $L-1$ additions, for a total of $N \times (L-1)$ additions for all correlation factors C. If the received sequence is comprised of complex numbers, and assuming that adding two complex numbers requires two additions, the calculation of each correlation factor $C_j$ requires $2(L-1)$ additions, for a total of $2N \times (L-1)$ additions for all correlation factors C. When the number of correlation factors N and the sync sequence length L are small, this prior art method for calculating correlation factors C does not impose a large computational burden. However, when number of correlation factors N and/or the sync sequence length L are large, then this traditional straightforward method of calculating correlation factors C is computationally burdensome. Further, where one received sequence is to be compared against a plurality of known sequences, such as in CDMA systems, the traditional straightforward method of calculating correlation factors is particularly inefficient.

Because many of the more advanced wireless communications systems rely on correlation schemes having large numbers of correlation factors N and large sync sequence lengths L, and because many compare a received sequence against a plurality of known sequences, there is a need for a more efficient method of computing sequence correlations.

SUMMARY OF THE INVENTION

The present invention is an improved method for computing sequence correlations that utilizes pre-calculated look-up tables to increase computational efficiency for correlating a sample sequence of symbols to a known sequence of symbols. A sample sequence of symbols, such as a received sequence of symbols, is divided into a series of subblocks. A look-up table of combinational values is built for each subblock wherein the combinational values are arithmetic sums of the symbols in the subblock, either as received or negated. Alternatively, such look-up tables may be built for all subblocks other than the first and the last subblock. Preferably, the combinational values are computed in Gray code order so as to take advantage of bit-shifting and sign changes to lessen computational burdens. Correlation factors are then calculated using the combinational values from these pre-calculated tables whenever possible. The correlation factors are then used in a known fashion to reach a correlation result. This method reduces the computational burden of computing correlations in many situations and is particularly helpful in performing joint demodulation, code acquisition, and/or interference cancellation in wireless communications systems.

DETAILED DESCRIPTION OF THE PREFERRED EMBODIMENT

Figure 1:
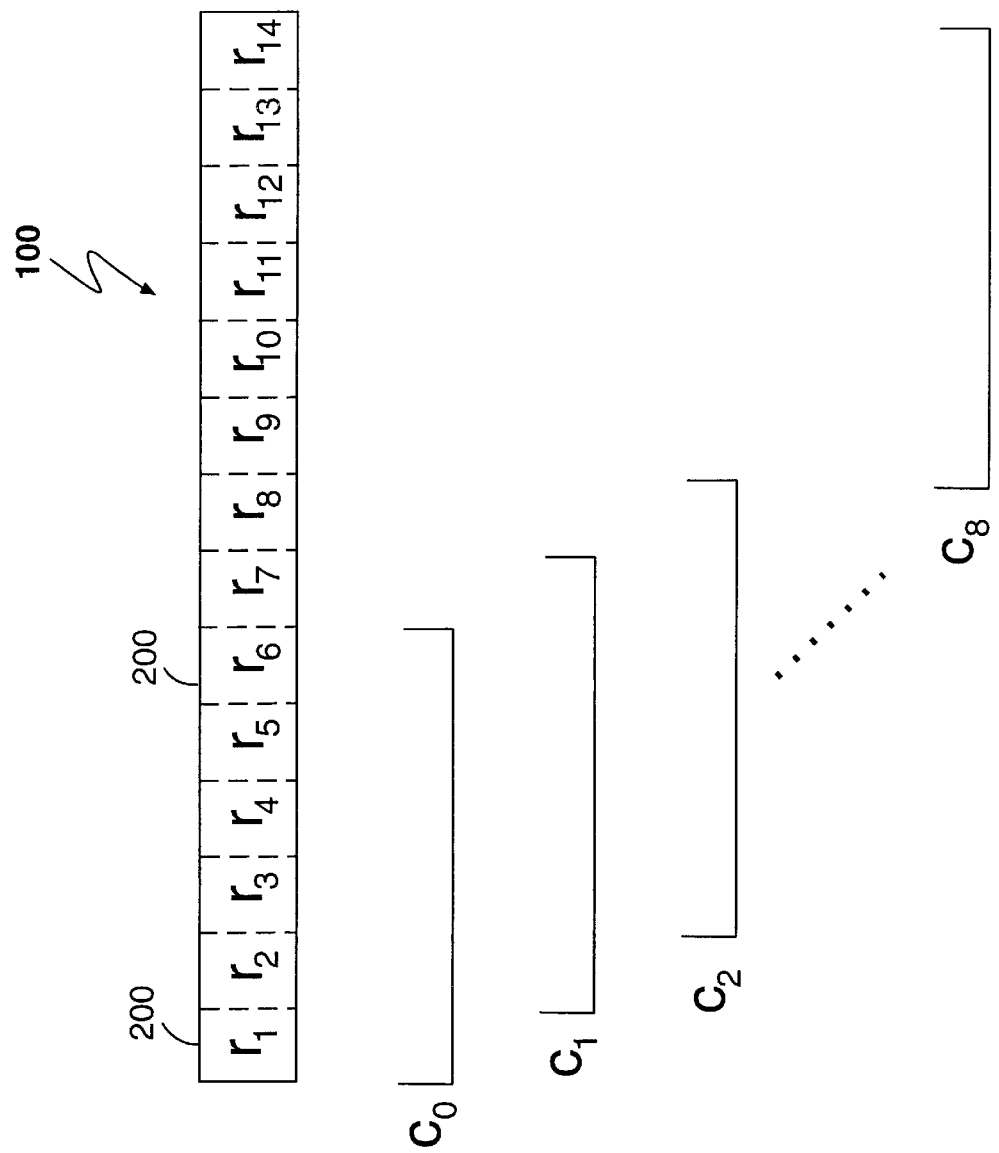
FIG. 1 is a communications frame and associated correlation increments.

The present invention improves the efficiency of computing correlations between a sample sequence and a known correlation sequence by pre-calculating and storing some of the values that feed into the correlation factor calculations. The values from these tables are then retrieved and used to more efficiently compute the correlation factors. The known correlation sequence may be a sync sequence or may be any other known sequence. The sample sequence may be a received communications signal or may be any other type of sequence, received or internally generated, which is to be correlated against the known correlation sequence, or a plurality of known sequences.

A synchronization correlation between a known sequence and a sample sequence is hereinafter described to illustrate the present method. It will be assumed that the known correlation sequence is a sync sequence which is bipolar (±1) and is an m-sequence. It should be noted that while the exact computational efficiencies described herein may not hold if these assumptions are altered, the general trend will be the same. Further, it will be assumed that both the sync sequence and the sample sequence are composed of symbols. It should be noted that the term symbol includes both single bit symbols and multi-bit symbols, depending on the nature of the sample sequence and the known correlation sequence.

A m-sequence is particular type of sequence typically used in synchronization situations. Some of the properties of m-sequences are described in F. J. MacWilliams and N. J. A. Slaone, *The Theory of Error-Correcting Codes*, Amsterdam, Netherlands: North-Holland, 1977 at pages 406–412. One of the properties of m-sequences is that every possible sign combination of the m-tuple appears once in the sequence. Thus, for m=3, all eight possible sign combinations appear and for m=4, all sixteen possible sign combinations appear. For m-sequences, the length of the corresponding sync sequence, L, is related to m by the formula $L=2^m-1$. Thus, for example, if m=3, then the known sequence length is $2^3-1=7$.

A sample sequence is shown in FIG. 1. The sample sequence in FIG. 1 is shown to be the same length as a communications frame 100, but other lengths are possible. The communications frame 100 includes a plurality of symbols 200, labeled $r_0, r_1, r_2, \ldots r_{F-1}$. In FIG. 1, the frame length F is fifteen and m is three. The boundaries between m-tuples are indicated by solid lines while the symbols 200 are indicated by dashed lines. As discussed above, FIG. 1 shows that each correlation factor $C_j$ corresponds to a different increment of the communications frame 100.

For simplicity, the present discussion will also assume that the sample sequence is a received sequence $r=(r_0, r_1, r_2, \ldots r_{F-1})$ and is composed of only real values, not complex values. However, as will be discussed later, the present invention encompasses received sequences having either or both real and complex values; only the discussion has been simplified.

The present method relies on pre-calculated tables, which are sometimes referred to as look-up tables. The preparation of the pre-calculated tables will be discussed in more detail below, but assume that K pre-calculated tables exist where K=F÷m. For instance, assume that m=3, corresponding to a known sequence length of seven, and the sample sequence length, F, is 15 as shown in FIG. 1. In this situation, the number of pre-calculated tables K is equal to 15÷3=5, thus there are five pre-calculated tables. If the sample sequence length F were not an exact multiple of m, then the number of tables K would be the integer portion of the quotient resulting from the calculation F÷m.

Each table corresponds to a particular subblock of the received sequence r. A subblock is a sequential portion of the received sequence r containing m symbols. No symbols belong to more than subblock. Thus, a first subblock contains $r_0, \ldots r_{m-1}$, the second subblock contains $r_m, \ldots r_{2m-1}$, and so forth. Each table is composed of combinational values for a particular corresponding subblock. Thus, the first table, Table 0, includes the combinational values of the first m elements of the received sequence r, Table 1 contains the combinational values of the next m elements of the received sequence r, and so forth.

As used herein, the term "combinational value" means the value representing the arithmetic sum of symbols in a symbol subblock where individual symbols may be negated prior to summing. For each combinational value, all symbols from the symbol subblock must be used, but used only once, in regular or negated form. Thus, for the symbol subblock a, b, c, d, one combinational value is the sum a+b+c+d; another combinational value is the sum −a+b−c+d; another combinational value is the sum −a−b+c−d, and so forth. For a symbol subblock size Y, there are $2^Y$ possible combinational values.

While combinational values are arithmetic sums, the calculation of combinational values may use other mathematical functions such as multiplication, division, etc. As discussed later, in a preferred embodiment the calculation of combinational values includes multiplication by two, reversing sign (negating, the mathematical equivalent of multiplying by minus one), and addition.

In this example, Table 0 covers the first m-tuple, which is comprised of the first three elements, $(r_0, r_1, r_2)$, and contains the sums:

TABLE 0

| |
|---|
| $r_0 + r_1 + r_2$ |
| $r_0 + r_1 - r_2$ |
| $r_0 - r_1 - r_2$ |
| $r_0 - r_1 + r_2$ |
| $-r_0 - r_1 + r_2$ |
| $-r_0 - r_1 - r_2$ |
| $-r_0 + r_1 - r_2$ |
| $-r_0 + r_1 + r_2$ |

For this example, when m=3, Table 0 contains eight values, each value being the sum of the symbol values indicated. Note that if each symbol value $r_i$ is assumed to be complex, as is typically the case in real-world applications, each value in Table 0 would be a complex number representing the sum of three complex numbers.

Similarly, Table 1 covers $(r_3, r_4, r_5)$, Table 2 covers $(r_6, r_7, r_8)$, Table 3 covers $(r_9, r_{10}, r_{11})$, and Table 4 covers $(r_{12}, r_{13}, r_{14})$.

TABLE 1

| |
|---|
| $r_3 + r_4 + r_5$ |
| $r_3 + r_4 - r_5$ |
| $r_3 - r_4 - r_5$ |
| $r_3 - r_4 + r_5$ |
| $-r_3 - r_4 + r_5$ |
| $-r_3 - r_4 - r_5$ |
| $-r_3 + r_4 - r_5$ |
| $-r_3 + r_4 + r_5$ |

TABLE 2

$r_6 + r_7 + r_8$
$r_6 + r_7 - r_8$
$r_6 - r_7 - r_8$
$r_6 - r_7 + r_8$
$-r_6 - r_7 + r_8$
$-r_6 - r_7 - r_8$
$-r_6 + r_7 - r_8$
$-r_6 + r_7 + r_8$

TABLE 3

$r_9 + r_{10} + r_{11}$
$r_9 + r_{10} - r_{11}$
$r_9 - r_{10} - r_{11}$
$r_9 - r_{10} + r_{11}$
$-r_9 - r_{10} + r_{11}$
$-r_9 - r_{10} - r_{11}$
$-r_9 + r_{10} - r_{11}$
$-r_9 + r_{10} + r_{11}$

TABLE 4

$r_{12} + r_{13} + r_{14}$
$r_{12} + r_{13} - r_{14}$
$r_{12} - r_{13} - r_{14}$
$r_{12} - r_{13} + r_{14}$
$-r_{12} - r_{13} + r_{14}$
$-r_{12} - r_{13} - r_{14}$
$-r_{12} + r_{13} - r_{14}$
$-r_{12} + r_{13} + r_{14}$

Now consider the first correlation factor $C_0$, which is calculated according to the formula:

$$C_0 = (s_0 r_0 + s_1 r_1 + s_2 r_2) + (s_3 r_3 + s_4 r_4 + s_5 r_5) + s_6 r_6$$

The first pair of parentheses indicate a combinational value that can be found in Table 0, while the second pair of parentheses indicates a combinational value that is found in Table 1. The method of finding values in the pre-calculated tables is described in more detail below. Using values from the pre-calculated tables, the computation of $C_0$ requires only two additions. This is compared with six additions for the prior art traditional straightforward method. Likewise, the formulas for $C_1$ through $C_8$ are given below:

$$C_1 = s_0 r_1 + s_1 r_2 + (s_2 r_3 + s_3 r_4 + s_4 r_5) + s_5 r_6 + s_6 r_7$$

$$C_2 = s_0 r_2 + (s_1 r_3 + s_2 r_4 + s_3 r_5) + (s_4 r_6 + s_5 r_7 + s_6 r_8)$$

$$C_3 = (s_0 r_3 + s_1 r_4 + s_2 r_5) + (s_3 r_6 + s_4 r_7 + s_5 r_8) + s_6 r_9$$

$$C_4 = s_0 r_4 + s_1 r_5 + (s_2 r_6 + s_3 r_7 + s_4 r_8) + s_5 r_9 + s_6 r_{10}$$

$$C_5 = s_0 r_5 + (s_1 r_6 + s_2 r_7 + s_3 r_8) + (s_4 r_9 + s_5 r_{10} + s_6 r_{11})$$

$$C_6 = (s_0 r_6 + s_1 r_7 + s_2 r_8) + (s_3 r_9 + s_4 r_{10} + s_5 r_{11}) + s_6 r_{12}$$

$$C_7 = s_0 r_7 + s_1 r_8 + (s_2 r_9 + s_3 r_{10} + s_4 r_{11}) + s_5 r_{12} + s_6 r_{13}$$

$$C_8 = s_0 r_8 + (s_1 r_9 + s_2 r_{10} + s_3 r_{11}) + (s_4 r_{12} + s_5 r_{13} + s_6 r_{14})$$

The parentheses indicate combinational values that can be found in the pre-calculated tables. To use the combinational values from the pre-calculated tables, the correct combinational value must be retrieved from the correct table. This is easily accomplished in a two step process. First, the correct table is selected by simply looking at which $r_i$ values are involved. If the m-tuple is $r_0, r_1, r_2$, Table 0 is used; if the m-tuple is $r_3, r_4, r_5$, Table 1 is used; and so forth.

Second, to select the correct combinational value from the selected table, the $s_i$ values involved are examined. It should be remembered that because the sync sequence is bipolar, the product $s_i r_{j+i}$ necessarily equals $\pm r_{j+i}$. That is, when $s_i$ is +1, $s_i r_{j+i}$ equals $r_{j+i}$ and when $s_i$ is -1, $s_i r_{j+i}$ equals $-r_{j+i}$. Thus, $s_i r_{j+i} + s_{i+1} r_{j+i+1} + s_{i+2} r_{j+i+2}$ must always equal one of the sign combinations of $\pm r_{j+i} \pm r_{j+i+1} \pm r_{j+i+2}$. The particular sign combination will depend on the particular values of s involved. For example, when the s values are +1, +1, +1, then the corresponding value of $s_i r_{j+1} + s_{i+1} r_{j+i+1} + s_{i+2} r_{j+i+2}$ equals $+r_{j+i} + r_{j+i+1} + r_{j+i+2}$. Applying this logic to the selection of combinational values from the selected table, when the m $s_i$ values are all +1, then the first combinational value from the table is used. If the m $s_i$ values are instead +1, -1, -1, the third combinational value is used, and so forth. Thus, the $s_i$ values act as an m-tuple index for the pre-calculated tables. In short, by examining which $r_i$ are involved and which values of $s_i$ are involved, the corresponding combinational value can be retrieved, or looked-up, from the pre-calculated tables and used to compute the correlation factor $C_j$.

The total computation of $C_0$ through $C_8$ in this example would require only 24 additions using the combinational values from pre-calculated tables, but 9×6=54 additions using the traditional straightforward method. Once the values of $C_0$ through $C_8$ are calculated, the proper frame boundary can be determined using known methods.

As can be seen from this example, the correlation factors $C_j$ can be computed with much fewer computational steps using pre-calculated tables than with the traditional straightforward method, assuming the pre-calculated tables already exist. This gain in efficiency must be balanced against the additional computational requirements to build the tables and the storage space required to store the tables.

Building the tables can be done in a number of ways. First, the symbol subblock combinational values can simply be calculated in a straightforward method. For the example above, Table 0 would require 16 additions, two for each of the eight values. Continuing with the example, calculating Table 0 through Table 4 would require 5×16=80 additions.

When these calculations are done in a binary computer, the number of additions required to compute the tables may be reduced by taking advantage of some characteristics of binary storage of values. The first characteristic is that changing signs of a value is essentially computationally free. The representation of each value in a binary computer includes an indication of sign for the value. To change the sign of a value can be accomplished by simply changing a predetermined bit, a process that requires a negligible amount of computing power as compared to an addition step. The second characteristic is that a value can likewise be multiplied by two for a negligible amount of computing power. This is accomplished by simply bit-shifting the value in a manner well known in the art.

Combining these characteristics with the sequencing calculations of combinational values in Gray code order allows the number of additions required to build the tables to be reduced significantly. A Gray code order is one in which the m-tuple combinations are sequenced such that only one symbol ($r_i$ in this discussion) changes from one combination to the next. The values of Table 0 above are arranged in such an order. From the first combinational value to the second, only the sign of $r_2$ is changed. From the second combinational value to the third, only the sign of $r_1$ is changed, and so forth. Thus, to get from the first combinational value to the second, one need only subtract two times the value of $r_2$. Getting the value of two times the value of $r_2$ can be done by bit-shifting $r_2$. Then the sign of $r_2$ can be negated by altering the sign bit. These two modifications to $r_2$ are essentially computationally free, as described above. Now, this new $-2r_2$ value can be added to the value of the first combination to compute the value of the second combination because $$(r_0+r_1+r_2)-2r_2=r_0+r_1-r_2$$

Thus, to get from the first combinational value to the second only requires a single addition. Likewise, the values of the remaining combinational values in the table can be computed using only one addition for each. Only the first combinational value requires two additions. By using these techniques, the number of additions required to build each table can be reduced from 16 to 9.

However, the number of additions can be reduced even more by taking advantage of the fact that the values in each table are in some sense redundant. When the combinational values in each table are sorted correctly, such as shown above, it can be seen that the last four combinational values are simply the negative of the first four combinational values. For example, in Table 0 note that the combination $-r_0-r_1+r_2$ (the fifth) is simply the combination $r_0+r_1-r_2$ (the second) multiplied by negative one. Accordingly, if the sign of the second combinational value is reversed, it becomes the fifth combinational value. Thus, it becomes possible to cut the size of each table in half and simply adjust the sign of the values when the values are "pulled" from the tables, as necessary. Thus, in the example above, Table 0 need only contain the following:

TABLE 0

| |
|---|
| $r_0 + r_1 + r_2$ |
| $r_0 + r_1 - r_2$ |
| $r_0 - r_1 - r_2$ |
| $r_0 - r_1 + r_2$ |

If the value $r_0+r_1-r_2$ is needed, then the second combinational value in the table is used. If, on the other hand, the combination $-r_0-r_1+r_2$ is needed, then the value of the second combination is retrieved from the table, negated, and used in the calculation. By taking advantage of this aspect of the tables, the number of additions needed to build each table is reduced to five (two for the first combination, one each for the remaining three).

By combining the techniques above, the number of additions required to fill all five tables of the example above is reduced from 80 to 25. Thus, the number of additions required to compute all the correlation factors, $C_0 \ldots C_8$, including those necessary to build the pre-calculated table, is 25 for building the tables plus 24 for computing the correlation factors using the pre-calculated tables, or a total of 49. This represents a reduction from the 54 additions required using the traditional method.

Finally, note that the first subblock ($r_0$, $r_1$, $r_2$) and the last subblock ($r_{12}$, $r_{13}$, $r_{14}$) each appear only once in the correlation factors $C_0 \ldots C_8$. Thus it is more efficient not to build pre-calculated tables for those two end subblocks. Thus pre-calculated tables need only built for Table 1, Table 2 and Table 3, thereby requiring only 15 additions instead of 25. Computing the correlation factors $C_0$ and $C_8$ now require four additions each instead of two, bringing the number of additions required to compute all correlation factors to 28 additions. Overall, this approach requires 15 additions to build the tables plus 28 to compute the correlation factors using the pre-calculated tables, for a total of 43. This represents a reduction from the 54 additions required using the traditional method, or the 49 from the other described method which built both Table 0 and Table 5.

So far, the discussion has assumed that each symbol $r_i$ was real, not complex. If each symbol $r_i$ is instead complex, the present method shows a twofold increase in efficiency versus the traditional method. Because adding two complex numbers is accomplished by adding the real portions and then separately adding the imaginary portions, the addition of two complex numbers can be considered as requiring two additions. As such, the discussion above can be easily broadened to encompass complex values of $r_i$ by simply multiplying the number of additions, bit shifts, etc. by two. Thus, continuing with the example described above, the number of additions required to compute $C_0 \ldots C_8$ if $r_i$ is complex is reduced from 108 to 98 by using the present method.

The discussion so far has focused on one example, where m=3. However, both F and m are larger in practical systems. The efficiency gained by using methods described for building the pre-calculated tables increases with increasing m. For instance, the reduction in computations for m=3 is 16÷5 or a factor of 3.2; for m=4, the savings is a factor of 4.8, 6.7 for m=5, converging to 2m for large m. Note, however, that the size of the pre-calculated table will increase with increasing m. The overall efficiency gains for the computation of all correlation factors, $C_0 \ldots C_j$, will depend on the values of F and m. While the gains may be different than those of the simplified example above, the trend would be for increasing total efficiency gains as F and m increase.

Further, significantly greater efficiency gains can be achieved when the received sequence is to be compared against multiple known sequences. In such case, the pre-calculated tables need only be built once, then these values can be repeatedly used to compute the various correlation factors. For instance, assume that the received sequence r above was to be compared against two different sync sequences s and s', both m-sequences of m=3. The prior method would require 54 additions for each sync sequence, for a total of 108 additions. In contrast, the present method would use 15 additions for building the pre-calculated tables, and 28 additions for each sync sequence, for a total of 71 additions. If three sync sequences are involved, the comparison becomes 162 to 99.

It is also possible that the tables can be constructed with fewer additions. From a conceptual viewpoint, m-sequences can be viewed as a worst case. This is because every possible sign combination of the m-tuple is needed for the correlation factors calculations. Other coding sequences do not use every sign combination, and some use particular combinations more than once. With such coding schemes, the pre-calculated tables need not contain all possible sign combinations of the m-tuple; therefore, it is possible that the tables can be built with less additions than with m-sequences. If so, then less storage space should be required to store the pre-calculated tables.

The present method has many applications, including synchronization and joint demodulation in wireless communications systems, such as TDMA and CDMA cellular telephone systems, including those operating under Telecommunications Industry Association Interim Standard IS-95. The present method also has application in code acquisition and interference cancellation. It is anticipated that the present method could be implemented at any hardware location within the communications system, including in a mobile unit or in a base station.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for correlating a received sequence of symbols to a known sequence of symbols, comprising:
    a) receiving a signal comprising a sequence of symbols;
    b) thereafter, forming one or more sequential subblocks of symbols from the received sequence of symbols, wherein said subblocks do not share said symbols between themselves;
    c) for each of said subblocks, building a look-up table of values wherein each value represents a different mathematical combination of symbols from said subblock; and
    d) correlating the received sequence of symbols and the known sequence of symbols to produce a correlation result using at least one of said values.

2. The method of claim 1 further comprising storing said look-up tables.

3. The method of claim 1 further comprising calculating a plurality of correlation factors using at least one of said values from said look-up tables.

4. The method of claim 1 further comprising performing joint demodulation using said correlation result.

5. The method of claim 1 further comprising performing code acquisition using said correlation result.

6. The method of claim 1 further comprising performing interference cancellation using said correlation result.

7. The method of claim 1 wherein one or more of symbols in said received sequence of symbols are complex.

8. The method of claim 1 wherein each of said mathematical combinations represented by said values is comprised of an arithmetic sum of each of said symbols in said symbol subblock as received or negated.

9. The method of claim 1 wherein each of said look-up tables includes every additive and subtractive combination of symbols in the corresponding subblock and wherein each of said symbols in said subblock are used only once for each such combination.

10. The method of claim 1 wherein said values in said look-up table are sorted in Gray code order.

11. The method of claim 1 wherein said correlating occurs in a wireless communications system mobile unit.

12. The method of claim 1 wherein said correlating occurs in a wireless communications system base station.

13. Using the method of claim 1 in a Code Division Multiple Access wireless communications system.

14. A method for correlating a received sequence of symbols to a known sequence of symbols, comprising:
    a) receiving a signal comprising a sequence of symbols;
    b) thereafter, forming a series of sequential subblocks of symbols from the received sequence of symbols; said series including a first subblock, a last subblock, and one or more intermediate subblocks, wherein said subblocks do not share said symbols between themselves;
    c) for each of said intermediate subblocks, building a look-up table of values wherein each value represents a different mathematical combination of symbols from said subblock; and
    d) using at least one of said values to correlate the received sequence of symbols and the known sequence of symbols.

15. The method of claim 14 further comprising storing said look-up tables.

16. The method of claim 14 further comprising calculating a plurality of correlation factors using at least one of said values from said look-up tables.

17. The method of claim 14 further comprising performing joint demodulation using said correlation result.

18. The method of claim 14 further comprising performing code acquisition using said correlation result.

19. The method of claim 14 further comprising performing interference cancellation using said correlation result.

20. The method of claim 14 wherein one or more of symbols in said received sequence of symbols are complex.

21. The method of claim 14 wherein each of said mathematical combinations represented by said values is comprised of an arithmetic sum of each of said symbols in said symbol subblock as received or negated.

22. The method of claim 14 wherein each of said look-up tables includes every additive and subtractive combination of symbols in the corresponding subblock and wherein each of said symbols in said subblock are used only once for each such combination.

23. The method of claim 14 wherein said values in said look-up table are sorted in Gray code order.

24. The method of claim 14 wherein said correlating occurs in a wireless communications system mobile unit.

25. The method of claim 14 wherein said correlating occurs in a wireless communications system base station.

26. Using the method of claim 14 in a Code Division Multiple Access wireless communications system.

27. A method of building a look-up table for use in correlating a received sequence of symbols with a known sequence of symbols, comprising:
    a) receiving the received sequence of symbols;
    b) thereafter, forming one or more sequential subblocks of symbols from the received sequence of symbols, wherein said subblocks do not share said symbols between themselves;
    c) for each of said subblocks, calculating a plurality of combinational values of said symbols in said symbol subblock; and
    d) for each of said subblocks, storing said combinational values in a look-up table.

28. The method of claim 27 wherein said calculating of combinational values is in Gray code order.

29. The method of claim 27 wherein said calculating includes bit shifting one or more of said symbols of said symbol subblock so as to multiply by two.

30. The method of claim 27 wherein said calculating includes negating one or more of said symbols of said symbol subblock.

31. The method of claim 27 further comprising computing a plurality of correlation factors using at least one of said combinational values.

32. The method of claim 27 wherein said computation occurs in a wireless communications system mobile unit.

33. The method of claim 27 wherein said computation occurs in a wireless communications system base station.

34. A method of building a look-up table for use in correlating a received sequence of symbols with a known sequence of symbols, comprising:

a) receiving the received sequence of symbols;

b) thereafter, forming a series of sequential subblocks of symbols from the received sequence of symbols; said series including a first subblock, a last subblock, and one or more intermediate subblocks, wherein said subblocks do not share said symbols between themselves;

c) for each of said intermediate subblocks, calculating a plurality of combinational values of said symbols in said symbol subblock; and d) for each of said intermediate subblocks, storing said combinational values in a look-up table.

35. The method of claim 34 wherein said calculating of combinational values is in Gray code order.

36. The method of claim 34 wherein said calculating includes bit shifting one or more of said symbols of said symbol subblock so as to multiply by two.

37. The method of claim 34 wherein said calculating includes negating one or more of said symbols of said symbol subblock.

38. The method of claim 34 further comprising computing a plurality of correlation factors using at least one of said combinational values.

39. The method of claim 34 wherein said computation occurs in a wireless communications system mobile unit.

40. The method of claim 34 wherein said computation occurs in a wireless communications system base station.

41. A method for correlating a received sequence of symbols to a known sequence of symbols in a wireless communications system, comprising:

a) receiving a signal comprising a sequence of symbols;

b) thereafter, forming a series of sequential subblocks of symbols from the received sequence of symbols; said series including a first subblock, a last subblock, and one or more intermediate subblocks, wherein said subblocks do not share said symbols between themselves;

c) for each of said intermediate subblocks, calculating a plurality of combinational values of said symbols in said symbol subblock in Gray code order;

d) for each of said intermediate subblocks, storing said combinational values in a look-up table;

e) computing a plurality of correlation factors using at least one of said combinational values; and f) correlating the received sequence of symbols and the known sequence of symbols to produce a correlation result using said correlation factors.

42. The method of claim 41 further comprising performing joint demodulation using said correlation result.

43. The method of claim 41 further comprising performing code acquisition using said correlation result.

44. The method of claim 41 further comprising performing interference cancellation using said correlation result.

45. The method of claim 41 wherein said correlating occurs in a wireless communications system mobile unit.

46. The method of claim 41 wherein said correlating occurs in a wireless communications system base station.

* * * * *